United States Patent [19]

Schröter

[11] Patent Number: 4,988,411
[45] Date of Patent: Jan. 29, 1991

[54] FILLING CAR FOR A COKE OVEN BATTERY

[75] Inventor: Horst Schröter, Viersen, Fed. Rep. of Germany

[73] Assignee: Harting, Kuhn & Co. Naschinenfabrik GmbH, Essen, Fed. Rep. of Germany

[21] Appl. No.: 527,113

[22] Filed: May 21, 1990

[30] Foreign Application Priority Data

May 26, 1989 [DE]  Fed. Rep. of Germany ....... 3917116

[51] Int. Cl.$^5$ ............................................. C10B 31/02
[52] U.S. Cl. .................................. 202/251; 202/262; 414/160; 414/163; 414/199
[58] Field of Search ............... 202/251, 262, 263, 246; 414/160, 163, 164, 199, 200

[56] References Cited

U.S. PATENT DOCUMENTS

| | | | |
|---|---|---|---|
| 1,842,199 | 1/1932 | Puening | 414/163 |
| 3,536,205 | 10/1970 | Bender | 202/262 |
| 3,576,263 | 4/1971 | Abendroth | 414/199 |
| 3,622,019 | 11/1971 | Lorrek | 202/262 |
| 3,753,502 | 8/1973 | Abendroth | 202/205 |
| 3,764,026 | 10/1973 | Olah | 202/262 |
| 3,958,700 | 5/1976 | Foy et al. | 202/262 |
| 4,066,175 | 1/1978 | Schulte | 202/262 |
| 4,176,994 | 12/1979 | Sangsts | 414/163 |
| 4,314,787 | 2/1982 | Kwasnik | 202/262 |
| 4,379,023 | 4/1983 | Stratmann et al. | 202/205 |

Primary Examiner—Peter Kratz
Attorney, Agent, or Firm—Michael J. Striker

[57] ABSTRACT

A filling car for filling coal in oven chambers of a coke oven battery comprises a telescopable filling pipe having an upper part and a lower part and a lower end to be lowerable to a filling frame of a filling opening of a coke oven battery, a supporting ring in which the lower part of the filling pipe is supported for turning about a horizontal axis, a liftable and lowerable supporting bracket in which the supporting ring is held, a mechanism for suspending the lower part of the filling pipe in the supporting ring and including two oppositely located hinge arms, and a mechanism for holding the supporting ring on the supporting bracket and including two oppositely located pivot pins arranged so that the supporting ring is turnable about a horizontal axis relative to the supporting bracket, the hinge arms and the pivot pins being offset relative to one another by 90°.

1 Claim, 1 Drawing Sheet

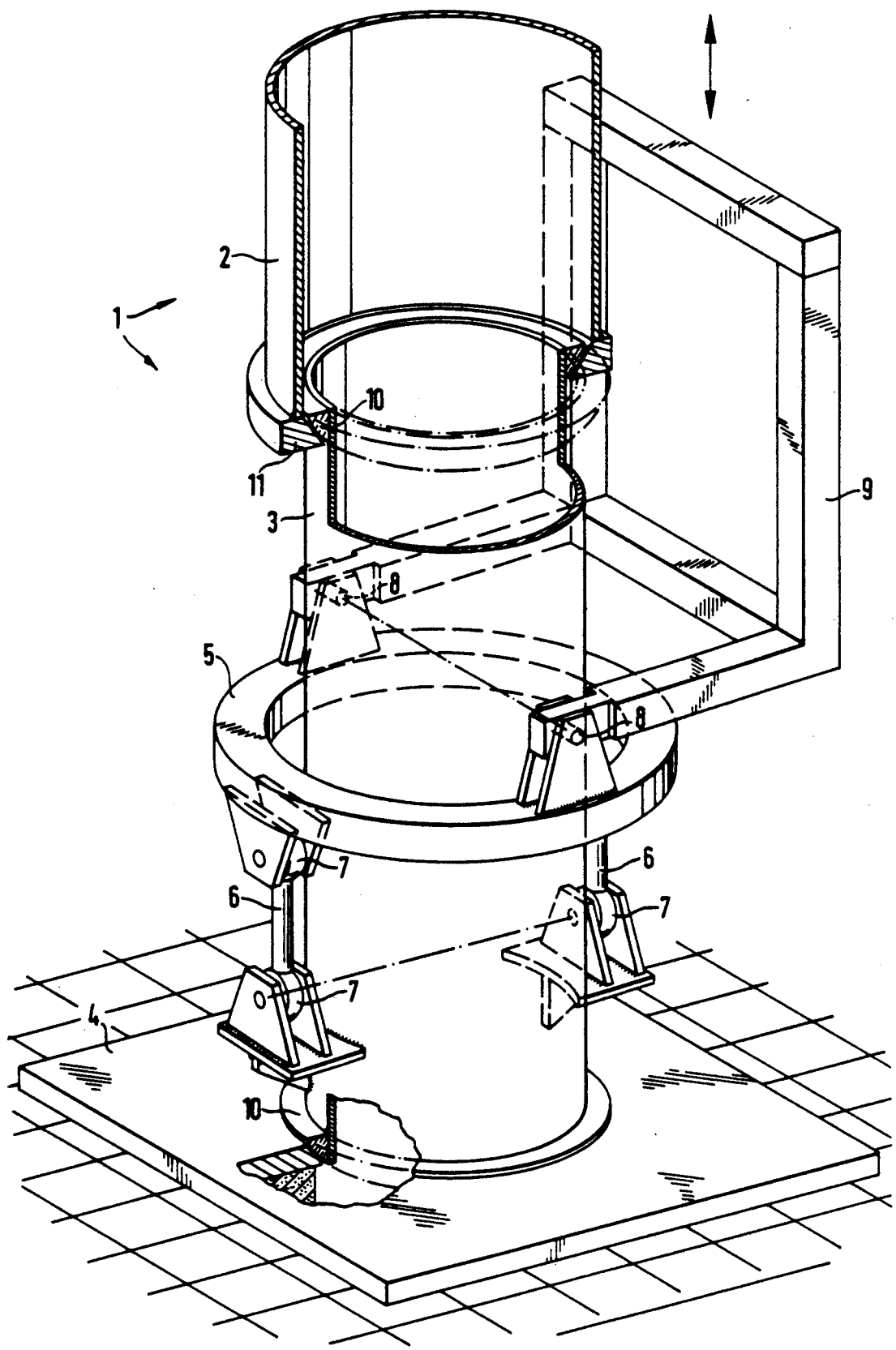

FILLING CAR FOR A COKE OVEN BATTERY

BACKGROUND OF THE INVENTION

The present invention relates to a filling car for filling coal in oven chambers of a coke oven battery. More particularly, it relates to such a filling car which has a telescopable filling pipe lowerable with its lower end on a filling frame of a filling opening of the coke oven battery, and in which the lower part of the filling pipe is suspended in a supporting ring turnable about a horizontal axis, which is in turn is held on a lowerable and liftable supporting bracket.

During operation of a filling car, it is necessary in view of the modern requirements for labor and environmental protection, to catch dust and tar containing gases produced during filling of the oven chambers and to convey them to the receiver of the coke oven battery. These gases are subjected to different conditions during the filling process and can escape due to negative pressure or insufficient draw to the receiver through the filling openings. For preventing this disadvantage, a reliable sealing between the lower end of the filling pipe and the filling frame on which the filling pipe is placed during the filling process, is required. In the practice, however, especially in old coke oven batteries with uneven coke oven tops, this led frequently to position inaccuracies of the filling cars. As a result, the vertical central axis of the fixed filling pipe of the coal container did not coincide with the vertical central axis of the filling opening or the filling frame and a greater or smaller offset produced between the central axes. This offset could amount to several centimeters. For providing a reliable sealing between the filling frame and the upper part of the filling pipe it was required to incline the lower part of the filling pipe in correspondence with the above mentioned offset. In many constructions this, however, was not possible.

German document DE-PS No. 2,922,571 describes a filling car in which the lower part of the filling pipe is suspended in a supporting ring which is turned about a horizontal axis. The supporting ring is held in turn in a liftable and lowerable supporting bracket. In this construction however the lower part of the filling pipe is turnable only in one direction, and a swinging movement of the filling pipe in this construction must be avoided. As a result, in this construction during lowering of the filling pipe to the filling frame, crescent-shaped untightness dependent on the offset can be produced. The filling gases can escape through such an untightness without any obstacle. If attempts are made to forcedly eliminate this untightness, irreversible damages can be done to the whole filling system.

SUMMARY OF THE INVENTION

Accordingly, it is an object of the present invention to provide a filling car for coke oven batteries, which avoids the disadvantages of the prior art.

More particularly, it is an object of the present invention to provide a filling car for a coke oven battery, in which the lower part of the filling pipe is guided so that it can assume an inclined position corresponding to the offset of the vertical central axes of the filling pipe and the filling opening and therefore provide a reliable sealing.

In keeping with these objects and with others which will become apparent hereinafter, one feature of the present invention resides, briefly stated, in a filling car in which the suspension of the lower part of the filling pipe in the supporting ring is performed by two oppositely located hinge arms provided with upper and lower hinge heads, and the supporting ring is supported in a supporting bracket turnably about a horizontal axis by means of two oppositely located pivot pins, wherein the hinge arms and the pivot pins are offset relative to one another by 90°.

Due to this suspension, the lower part of the filling pipe can perform a conical, spatial swinging movement about its suspension point and therefore assume an inclined position required for a reliable sealing of the filling pipe and the filling opening.

In accordance with a further feature of the present invention, it is advantageous to arrange sealing rings at upper and lower ends of the lower part of the filling pipe to provide a realiable sealing between the upper and lower parts of the filling pipe and between the lower part of the filling pipe and the filling frame. Preferably, the sealing rings can be formed as spherical layers.

With such a construction, the sealing rings in each position of the lower part can exactly be adapted to both the filling frame at the outlet of the lower part of the filling pipe and to the filling frame. Therefore, a reliable sealing is ensured.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

The single FIGURE of the drawings is a view showing schematically a filling car for a coke oven battery in accordance with the present invention.

DESCRIPTION OF A PREFERRED EMBODIMENT

A filling car for a coke oven battery has a filling pipe which is identified as a whole with reference numeral 1. The filling pipe 1 is telescopable and composed of an upper part 2 and a lower part 3. It is arranged under an immovable filling pipe of a coal container, and the upper end of the upper part 2 surrounds the filling pipe of the coal container. The coal container with its filling pipe and other details of a filling car are not shown in the drawing, since they are not important for an understanding of the present invention. They can perform in correspondence with the constructions of the prior art.

The coal container with the associated filling pipe is arranged above the filling pipe 1. Therefore, the coal can flow under the action of gravity through the filling pipe 1 to an oven chamber of a coke oven battery indicated under the filling pipe 1. The lower part 3 of the filling pipe 1 is lowered for this purpose onto a filling frame 4. In order to perform the lowering, the lower part 3 is suspended in a supporting ring 5 by two oppositely located hinge arms 6. The hinge arms 6 are provided with spherically shaped hinge heads 7 on their upper and lower ends to ensure the desired movability of the lower part 3.

The supporting ring is mounted in turn on a supporting bracket 9 by two oppositely located rotary pins 8 and is turnable about a horizontal axis. A supporting bracket 9 is liftable and lowerable as identified in the drawing with the double arrow. By the respective movement of the supporting bracket 9, the lower part 3 of the filling pipe 1 can be lowered onto the filling frame 4 or lifted from the latter.

In the filling car in accordance with the present invention, the hinge arms 6 and the pivot pins 8 are arranged so that they are offset relative to one another by 90°. This can be clearly recognized from the drawing. A sealing ring 10 is arranged at the upper and lower ends of the lower part 3. The sealing rings are preferably as spherical layers. The sealing rings 10 in each position of the lower part 3 provide for the required sealing of the lower part 3 relative to the filling frame 4 and also for sealing of the lower part 3 relative to a sealing frame 11 of the upper part 2 of the filling pipe 1.

It is believed to be understood that in practice a certain deviation from the construction shown in the drawing can be made in accordance with the spirit of the present invention. For example the supporting ring 5 and the supporting bracket 9 can have a different shape. What is important is that in any case the hinge arms 6 and the pivot points 8 are offset relative to one another by 90°.

It will be understood that each of the elements described above, or two or more together, may also find a useful application in other types of constructions differing from the types described above.

While the invention has been illustrated and described as embodied in a filling car for filling coal in oven chambers of coke oven batteries, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A filling car for filling coal in oven chambers of a coke oven battery, comprising a telescopable filling pipe having an upper part and a lower part and a lower end to be lowerable to a filling frame of a filling opening of a coke oven battery; a supporting ring in which said lower part of said filling pipe is supported for turning about a horizontal axis; a liftable and lowerable supporting bracket in which said supporting ring is held; means for suspending said lower part of said filling pipe in said supporting ring and including two oppositely located hinge arms; and means for holding said supporting ring on said supporting bracket and including two oppositely located pivot pins arranged so that said supporting ring is turnable about a horizontal axis relative to said supporting bracket, said hinge arms and said pivot pins being offset relative to one another by 90°.

2. A filling car as defined in claim 1; and further comprising means for sealing said lower part of said filling pipe at upper and lower ends of said lower pipe.

3. A filling car as defined in claim 2, wherein said sealing means being formed as sealing rings arranged at the upper and lower ends of said lower part of said lower pipe.

4. A filling car as defined in claim 3, wherein said sealing rings are formed as spherical layers.

5. A filling car as defined in claim 1, wherein said hinge arms have upper and lower ends provided with hinge heads.

6. A filling car as defined in claim 5, wherein said hinge heads of said hinge arms are spherical.

* * * * *